US005657302A

United States Patent [19]
Kato

[11] Patent Number: 5,657,302
[45] Date of Patent: Aug. 12, 1997

[54] HARDWARE IMPLEMENTED METHOD AND APPARATUS FOR LOCATING A TARGET SECTOR OF AN OPTICAL MEDIA

[75] Inventor: Keisuke Kato, Kanagawa-ken, Japan

[73] Assignee: Cirrus Logic, Inc., Fremont, Calif.

[21] Appl. No.: 708,099

[22] Filed: Aug. 16, 1996

Related U.S. Application Data

[63] Continuation of Ser. No. 309,962, Sep. 20, 1994, abandoned.
[51] Int. Cl.$^6$ .................................................... G11B 7/085
[52] U.S. Cl. ............................ 369/32; 369/48; 369/50; 369/58; 369/124
[58] Field of Search ......................... 369/32, 47–50, 369/54, 58, 59, 111, 124

[56] References Cited

U.S. PATENT DOCUMENTS

| | | |
|---|---|---|
| 4,855,725 | 8/1989 | Fernandez . |
| 4,901,318 | 2/1990 | Tomisawa . |
| 5,245,600 | 9/1993 | Yamauchi et al. ............. 369/49 |
| 5,253,242 | 10/1993 | Satoh et al. .................. 369/32 X |
| 5,432,762 | 7/1995 | Kubo et al. ................... 369/32 |

OTHER PUBLICATIONS

*Multimedia: Making It Work*, "CD–ROMs in Multimedia", pp. 421–438, Tay Vaughan, 1993.

*Primary Examiner*—W. R. Young
*Attorney, Agent, or Firm*—Robert Platt Bell; Steven A. Shaw; Haverstock & Assoc.

[57] ABSTRACT

A header detect method and apparatus for an optical media decoder circuit includes one or more comparators which compare target header information to header information read from the optical media for a current sector and each subsequent sector until the header information read from the optical media matches the target header information. The target header information is programmed into one or more target header registers. The information stored in the target header registers is then compared to the header information read from the optical media. Multiple comparators are used, to compare the header information read from the optical media for the current sector and a number of previous sectors to the target header information programmed into each of the target header registers, in order to provide a redundancy within the system and allow the apparatus to locate the target header even if one or more of the registers contain errors. The comparators activate a match signal when the header information read from the optical disk matches the target header information. The control logic circuit will then output a sector found signal which notifies the optical media decoder that the target sector has been located. If multiple comparators are included, a system designer may program a predetermined threshold, specifying a number of match signals which must be activated before the control logic circuit outputs the sector found signal.

27 Claims, 1 Drawing Sheet

HARDWARE IMPLEMENTED METHOD AND APPARATUS FOR LOCATING A TARGET SECTOR OF AN OPTICAL MEDIA

This application is a continuation of application Ser. No. 08/309,962, filed Sep. 20, 1994, now abandoned.

FIELD OF THE INVENTION

The present invention relates to the field of information storage medium and an apparatus for detecting and reproducing information from the information storage medium. More specifically, the present invention relates to the field of detecting specific target information within a stream of information read from an information storage apparatus.

BACKGROUND OF THE INVENTION

Information is stored on optical media disks in one of multiple standard formats depending on the specific format of the information. There are four commonly used commercially standard formats. The Red Book standard is used to store audio information on music compact optical disks (CDs). The Yellow Book standard is used to store information on CD-Rom. The Green Book standard is used for interactive CD. The Orange Book standard is used for Kodak's Photo CD. A CD may contain one or more tracks on which information is stored. Each track on the CD may use a different format which allows for the creation of a mixed mode CD that has a combination of multiple formats of information such as audio and video.

A sector, which is 1/75 of a second in length, is the primary logical unit for data storage on a CD. Each sector of a CD contains 2352 bytes of data. Though the formats of sectors are different depending on the standard used, each sector in any of the standard formats described above includes at least a sync field, a header field and a data field. For the standard formats, the header is preceded by a sync field which is used to synchronize the controller to the header and the data within the sector at the start of each sector.

For the standard formats, the header portion includes four bytes of information about the data in that sector including its location relative to the other sectors and the mode of data stored in that sector. The first three bytes of the header are used to identify the sector. Each sector header is unique and includes a minute byte, a second byte and a frame byte which are all used to identify the location of the sector relative to the other sectors on the CD. There are seventy five frames within a second and sixty seconds within a minute. The header also includes a mode byte which specifies the standard used to store the data within this sector.

All of the headers are consecutively numbered throughout the media. For instance, in the first sector of the media, the minute byte is equal to 0, the second byte is equal to 2 and the frame byte is equal to 0. In the next sector, the minute byte is also equal to 0, the second byte is also equal 2, but the frame byte is equal to 1. For each subsequent sector the frame byte is incremented until it equals 74. In the next sector, the second byte is incremented and the frame byte has a value of 0. The second byte is incremented for every 75 frame bytes, 0 through 74. Similarly, once the second byte is equal to 59, for the next sector, the second byte and the frame byte are equal to 0 and the minute byte is incremented. The minute byte is incremented once for every 60 times the second byte is incremented.

Within a player or drive, a CD spins at a constant linear velocity, allowing data to be read at a constant density and spacing. Therefore, the rotational speed of the disk varies from the outer edge of the disk to its center. Such players and drives use very sensitive motors for ensuring that no matter where the read head is on the disk, approximately the same amount of data is read in each second.

When searching for specific targeted data on a CD, a player or drive reads the header information for each sector and compares it to the target header information. This process is repeated for each subsequent header until the current header matches the target header. Previously, this process was done using software within the system controller. The system controller uses this software to enable the hardware to read each header and compare it to the target header until the header read from the disk matches the target header. Once there is a match, the information within the current and subsequent sectors is transferred to the host. For present applications this method of finding and identifying targeted headers has been adequate. However, as technology continues to improve and the rotational speeds of CDs increase, such a software implemented method will become limiting and too slow for most applications because, with a software implementation the controller is unable to perform other tasks while finding and identifying target sectors. What is needed is a method and apparatus which facilitates access of storage media without intervention by the system controller, which frees the system controller for completion of other tasks during storage media access.

SUMMARY OF THE INVENTION

A header detect method and apparatus for an optical media decoder circuit includes one or more comparators which compare target header information to header information read from the optical media for a current sector and each subsequent sector until the header information read from the optical media matches the target header information. The target header information is programmed into one or more target header registers. The information stored in the target header registers is then compared to the header information read from the optical media. Multiple comparators are used, to compare the header information read from the optical media for the current sector and a number of previous sectors to the target header information programmed into each of the target header registers, in order to provide a redundancy within the system and allow the apparatus to locate the target header even if one or more of the registers contain errors. The comparators activate a match signal when the header information read from the optical disk matches the target header information. The control logic circuit will then output a sector found signal which notifies the optical media decoder that the target sector has been located. If multiple comparators are included, a system designer may program a predetermined threshold, specifying a number of match signals which must be activated before the control logic circuit outputs the sector found signal.

DETAILED DESCRIPTION OF THE PREFERRED EMBODIMENT

Figure 1:
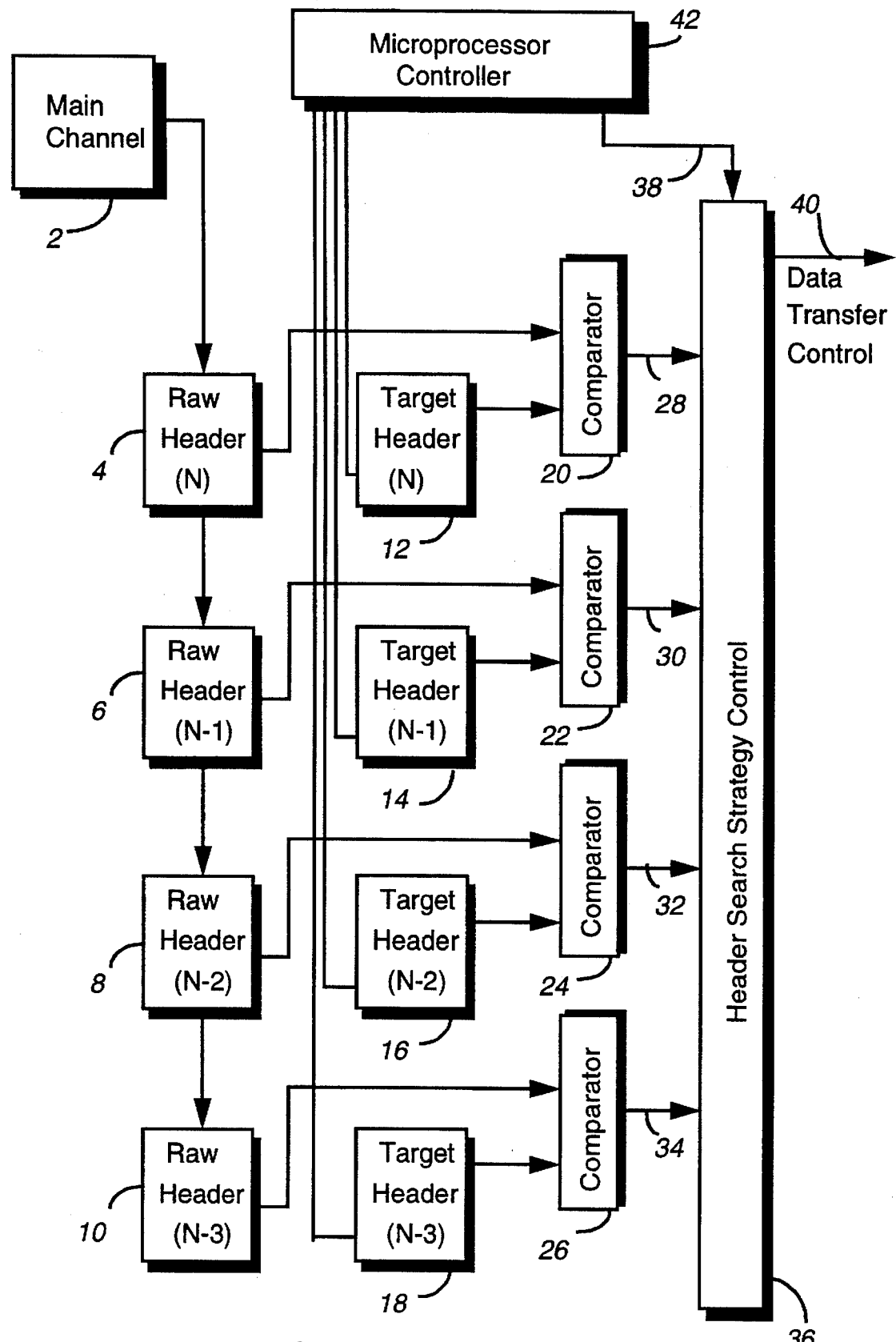
FIG. 1 illustrates a block diagram schematic of the preferred embodiment of a header detect apparatus of the present invention.

A block diagram schematic of the preferred embodiment of the present invention is illustrated in FIG. 1. The header information is read from the optical media and transferred through the main channel transfer circuit 2. The main channel transfer circuit 2 is coupled to the first raw header register 40. The first raw header register 4 is coupled to the first comparator 20 and to the second raw header register 6. The second raw header register 6 is coupled to the second comparator 22 and to the third raw header register 8. The third raw header register 8 is coupled to the third comparator 24 and to the fourth raw header register 10. The fourth raw header register 10 is coupled to the fourth comparator 26. Each of the raw header registers 4, 6, 8 and 10 of the preferred embodiment are three-byte registers capable of storing the first three bytes of a header that is read from the optical media.

The first target header register 12 is coupled to the first comparator 20. The second target header register 14 is coupled to the second comparator 22. The third target header register 16 is coupled to the third comparator 24. The fourth target header register 18 is coupled to the fourth comparator 26. The microprocessor controller 42 is coupled to each of the target header registers 12, 14, 16 and 18 for programming the target header information into the target header registers 12, 14, 16 and 18. Each of the target header registers 12, 14, 16 and 18 of the preferred embodiment are three-byte registers capable of storing the first three bytes of a target header.

The output signal line 28 of the first comparator 20 is coupled to the header search strategy control circuit 36 for signalling when the information stored in the first raw header register 4 is equal to the information stored in the first target header register 12. The output signal line 30 of the second comparator 22 is coupled to the header search strategy control circuit 36 for signalling when the information stored in the second raw header register 6 is equal to the information stored in the second target header register 14. The output signal line 32 of the third comparator 24 is coupled to the header search strategy control circuit 36 for signalling when the information stored in the third raw header register 8 is equal to the information stored in the third target header register 16. The output signal line 34 of the fourth comparator 26 is coupled to the header search strategy control circuit 36 for signalling when the information stored in the fourth raw header register 10 is equal to the information stored in the fourth target header register 18.

The output signal line 40 of the header search strategy control circuit 36 is coupled to the Data Transfer Control Logic for signalling when a specified number of the output signal lines 28, 30, 32 and 34 are activated, which will initiate a data transfer without CPU intervention. The microprocessor controller 42 is also coupled to the header search strategy control circuit 36 by the header search strategy select signal lines 38 for specifying the number of the output signal lines 28, 30, 32 and 34 which must be activated before the output signal line 40 is activated.

In operation, when a specific target sector is identified, the microprocessor controller 42 loads the minute byte, the second byte and the frame byte for the targeted sector in the first target header register 12. The microprocessor controller 42 also loads the minute byte, the second byte and the frame byte for the three sectors previous to the targeted sector into the second, third and fourth target header registers 14, 16 and 18, respectively. The microprocessor controller 42 also programs the header search strategy select signal lines 38 to equal the threshold number of the output signal lines 28, 30, 32 and 34 which must be activated in order to signal a match. This threshold number may be set, by the system designer, to equal a value from one to the number of comparators included, depending on the accuracy desired for the specific application in which the present invention is to be used. In the preferred embodiment, because four comparators 20, 22, 24 and 26 are included, the threshold number may be programmed to equal a value from one to four.

It is possible that a portion of the information loaded into the target header registers 12, 14, 16 and 18 or a portion of the information read from the optical media and loaded into the raw header registers 4, 6, 8 and 10 may be in error. For this reason, the multiple comparators 20, 22, 24 and 26 are included in the present invention in order to provide a redundancy in the system and allow a targeted sector to be located, even in the presence of such data transmission errors. The system designer is therefore allowed the ability to program the threshold number according to the accuracy desired.

The header information read from the current sector is transferred through the main channel transfer circuit 2 and stored in the first raw header register 4. Simultaneously, the header information previously stored in the first raw header register 4 is transferred to the second raw header register 6, the header information previously stored in the second raw header register 6 is transferred to the third raw header register 8 and the header information previously stored in the third raw header register 8 is transferred to the fourth raw header register 10. The information stored in each of the raw header registers 4, 6, 8 and 10 is compared to the information stored in the corresponding one of the target header registers 12, 14, 16 and 18, by the appropriate one of the comparators 20, 22, 24 and 26. This process is repeated for each subsequent sector until the specified number of the output signal lines 28, 30, 32 and 34 are activated, signalling that the target sector is the current sector. The output signal line 40 is activated by the header search strategy control circuit 36 when the specified number of the output signal lines 28, 30, 32 and 34 are activated, in order to initiate a data transfer without CPU intervention.

As described above, the circuit of the preferred embodiment includes four comparators 20, 22, 24 and 26, four target header registers 12, 14, 16 and 18 and four raw header registers 4, 6, 8 and 10. Alternatively, as should be apparent to one skilled in the art, any number of comparators and corresponding raw and target header registers may be included according to the accuracy desired and the application for which the present invention is to be used. The threshold numbers of matching output signals generated may then be programmed to equal any number from one to the number of comparators used.

The preferred embodiment of the present invention is designed to operate in a CD-Rom system. As should be apparent to one skilled in the art, the present invention may alternatively be adapted for use in other optical media systems, including but not limited to a Mini-disk system.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

I claim:

1. An integrated circuit for locating a specific target sector of an optical media, the optical media comprising a plurality of sectors including the specific target sector, each of the plurality of sectors being uniquely identified by an identifier information, the integrated circuit comprising:

a. at least one target register for receiving and storing the identifier information of a plurality of target sectors, the plurality of target sectors including the specific target sector, and wherein the plurality of target sectors are contained within the plurality of sectors;

b. at least one data register for receiving the identifier information read from the optical media for a current sector, wherein said at least one data register is loaded with the identifier information for the current sector and with the identifier information for sectors previous to the current sector;

c. at least one comparator coupled to said at least one target register and to said at least one data register, said at least one comparator comparing the identifier information stored in each of said at least one target register to the identifier information stored in a corresponding data register; and d. a searching logic circuit coupled to said at least one comparator, said searching logic circuit receiving a match signal from each of said at least one comparator when the identifier information stored in a target register is equal to the identifier information stored in the corresponding data register, wherein said searching logic circuit indicates that the specific target sector is located upon receiving a number of the match signals, wherein the number is greater than or equal to one.

2. The integrated circuit as claimed in claim 1 wherein the searching logic circuit is coupled for signalling a match condition when a predetermined number of match signals are activated.

3. The integrated circuit as claimed in claim 2 wherein a controller logic circuit is coupled to the searching logic circuit for programming the predetermined number of match signals which must be activated before a match condition is signalled.

4. The integrated circuit as claimed in claim 3 wherein said at least one target register includes four target registers, said at least one data register includes four data registers and said at least one comparator includes four comparators.

5. The integrated circuit as claimed in claim 4 wherein the identifier information for a target sector and for a read sector is taken from a header portion of the sector.

6. The integrated circuit as claimed in claim 5 wherein the identifier information includes three bytes of data comprised of a minute byte, a second byte and a frame byte.

7. An integrated circuit for locating a specific target sector of a CD-Rom, the CD-rom comprising a plurality of sectors including the specific target sector, each of the plurality of sectors being uniquely identified by an identifier information, the integrated circuit comprising:

a. at least one target register for storing the identifier information of a plurality of target sectors, the plurality of target sectors including the specific target sector, and wherein the plurality of target sectors are contained within the plurality of sectors;

b. at least one data register for receiving the identifier information read from the CD-Rom for a current sector, wherein a first data register is loaded with the identifier information for the current sector, the first data register being comprised in the plurality of data registers, and remaining data registers are loaded with the identifier information for sectors previous to the current sector;

c. at least one comparator coupled to a corresponding one of said at least one target register and to a corresponding one of said at least one data register, said at least one comparator comparing the identifier information stored in each of said at least one target register to the identifier information stored in the corresponding data register;

d. a searching logic circuit coupled to said at least one comparator, said searching logic circuit receiving a match signal from each of said at least one comparator when the identifier information stored in a target register is equal to the identifier information stored in the corresponding data register, wherein said searching logic circuit indicates that the specific target sector is located upon receiving a number of the match signals, wherein the number is greater than or equal to one; and e. a controller logic circuit coupled to each of the said at least one target register for loading the identifier information of the plurality of target sectors in each of the plurality of target registers.

8. The integrated circuit as claimed in claim 7 wherein the searching logic circuit is coupled for signalling a match condition when a predetermined number of match signals are activated.

9. The integrated circuit as claimed in claim 8 wherein the controller logic circuit is coupled to the searching logic circuit for programming the predetermined number of match signals which must be activated before a match condition is signalled.

10. The integrated circuit as claimed in claim 9 wherein said at least one target register includes four target registers, said at least one data register includes four data registers and said at least one comparator includes four comparators.

11. The integrated circuit as claimed in claim 10 wherein the identifier information for a target sector and for a read sector is taken from a header portion of the sector.

12. The integrated circuit as claimed in claim 11 wherein the identifier information includes three bytes of data comprised of a minute byte, a second byte and a frame byte.

13. An integrated circuit for locating a specific target sector of information stored on a mini-disk, the mini-disk comprising a plurality of sectors including the specific target sector, each of the plurality of sectors being uniquely identified by an identifier information, the integrated circuit comprising:

a. at least one target register for storing identifier information of a plurality of target sectors, the plurality of target sectors comprising the specific target sector, the plurality of target sectors being contained within the plurality of sectors;

b. at least one data register for receiving the identifier information read from the mini-disk for a current sector comprised in the plurality of sectors, wherein said at least one data register is loaded with the identifier information for the current sector and with the identifier information for sectors previous to the current sector;

c. at least one comparator each coupled to an appropriate one of said at least one target register and to a corresponding one of said at least one data register, said at least one comparator comparing the identifier information stored in each of the plurality of target registers to the identifier information stored in the corresponding data register;

d. a searching logic circuit coupled to the at least one comparator for receiving a match signal from each of the at least one comparator when the identifier information stored in a target register is equal to the identifier information stored in the corresponding data register; and e. a controller logic circuit coupled to each of the plurality of target registers for loading the identifier information of the plurality of target sectors in each of the one or more target registers.

14. The integrated circuit as claimed in claim 13 wherein the searching logic circuit is coupled for signalling a match condition when a predetermined number of match signals are activated.

15. The integrated circuit as claimed in claim 14 wherein the controller logic circuit is coupled to the searching logic circuit for programming the predetermined number of match signals which must be activated before a match condition is signalled.

16. The integrated circuit as claimed in claim 15 wherein the one or more target registers includes four target registers, the one or more data registers includes four data registers and the one or more comparators includes four comparators.

17. The integrated circuit as claimed in claim 16 wherein the identifier information for a target sector and for a read sector is taken from a header portion of the sector.

18. The integrated circuit as claimed in claim 17 wherein the identifier information includes three bytes of data comprised of a minute byte, a second byte and a frame byte.

19. A method of identifying and locating a specific target sector of an optical media, the optical media comprising a plurality of sectors including the specific target sector, each of the plurality of sectors being uniquely identified by an identifier information, the method comprising the steps of:
   a. loading identifier information for each of the specific target sector and a plurality of previous target sectors previous to the specific target sector into a corresponding one of at least one target sector register;
   b. reading identifier information for a current sector from the optical media and storing the identifier information into a current sector data register, wherein the current sector is comprised in the plurality of sectors;
   c. loading identifier information for each of a plurality of previous sectors previous to the current sector into a corresponding one of at least one previous data register;
   d. comparing the identifier information in a first target register to the identifier information stored in the current sector data register, wherein the first target register is comprised in the at least one target register;
   e. activating a first match signal line when the identifier information in the first target register is equal to the identifier information in the current sector data register;
   f. comparing the identifier information in each of the at least one previous target register to the corresponding identifier information stored in one of the at least one previous data register;
   g. activating one or more subsequent match signal lines each time the identifier information in one of the plurality of previous target registers is equal to the identifier information in one of the previous data registers;
   h. repeating steps b–g until a predetermined number of match signal lines have been activated; and
   i. activating a target sector identified signal when the predetermined number of match signal lines have been activated.

20. The method as claimed in claim 19 wherein the method is implemented in an integrated circuit.

21. The method as claimed in claim 20 further comprising the step of programming the predetermined number of match signal lines required to be activated before the target sector identified signal is activated.

22. The method as claimed in claim 21 wherein the identifier information is taken from a header portion of the sector.

23. The method as claimed in claim 22 wherein the identifier information includes three bytes of data comprised of a minute byte, a second byte and a frame byte.

24. An integrated circuit for locating a specific target sector of information stored on an optical media, the optical media comprising a plurality of sectors including the specific target sector, each of the plurality of sectors being uniquely identified by an identifier information, the integrated circuit comprising:
   a. a first target register for storing the identifier information of the specific target sector;
   b. a second target register for storing the identifier information of a first previous target sector;
   c. a third target register for storing the identifier information of a second previous target sector;
   d. a fourth target register for storing the identifier information of a third previous target sector, wherein the first, second and third previous target sectors are previous to the specific target sector;
   e. a controller logic circuit coupled to the first, second, third and fourth target registers for loading the identifier information of the first, second, third, and fourth previous target sectors in the first, second, third and fourth target registers respectively;
   f. a current data register for storing the identifier information read from the optical media for a current sector, the current sector being comprised in the plurality of sectors;
   g. a first previous data register coupled to the current data register for storing the identifier information for the first previous sector to the current sector;
   h. a second previous data register coupled to the first previous data register for storing the identifier information for the second previous sector to the current sector;
   i. a third previous data register coupled to the second previous data register for storing the identifier information for the third previous sector to the current sector;
   j. a first comparator coupled to the current data register and to the first target register for comparing the identifier information stored in the current data register to the identifier information stored in the first target register and activating a first match signal when the identifier information stored in the current data register is equal to the identifier information stored in the first target register;
   k. a second comparator coupled to the first previous data register and to the second target register for comparing the identifier information stored in the first previous data register to the identifier information stored in the second target register and activating a second match signal when the identifier information stored in the first previous data register is equal to the identifier information stored in the second target register;
   l. a third comparator coupled to the second previous data register and to the third target register for comparing the identifier information stored in the second previous data register to the identifier information stored in the third target register and activating a third match signal when the identifier information stored in the second previous data register is equal to the identifier information stored in the third target register;

m. a fourth comparator coupled to the third previous data register and to the fourth target register for comparing the identifier information stored in the third previous data register to the identifier information stored in the fourth target register and activating a fourth match signal when the identifier information stored in the third previous data register is equal to the identifier information stored in the fourth target register; and n. a match control logic circuit coupled to the first, second, third and fourth comparators for activating a target sector identified signal when a predetermined number of the first, second, third and fourth match signals are activated.

25. The integrated circuit as claimed in claim 24 wherein the controller logic circuit is further coupled to the match control logic circuit for programming the predetermined number of the first, second, third and fourth match signals which must be activated before the target sector identified signal is activated.

26. The integrated circuit as claimed in claim 25 wherein the identifier information for each target sector and for the current sector and each previous sector to the current sector is taken from a header portion of the sector.

27. The integrated circuit as claimed in claim 26 wherein the identifier information includes three bytes of data comprised of a minute byte, a second byte and a frame byte.

* * * * *